US012549684B2

(12) United States Patent
Jeyakumar et al.

(10) Patent No.: US 12,549,684 B2
(45) Date of Patent: Feb. 10, 2026

(54) ADJUSTING A USER INTERFACE OF A VIRTUAL MEETING BASED ON A PARTICIPANT MOTION

(71) Applicant: Google LLC, Mountain View, CA (US)

(72) Inventors: Kevin Jonathan Jeyakumar, Seattle, WA (US); Juan Carlos Angustia Garcia, Philadelphia, PA (US); Antoinette Garlit Salom, Honolulu, HI (US); Shannon Ona Wei Sum Juzenas, Bothell, WA (US); Jared O'Connor, Issaquah, WA (US); Alia Walid Awni, Seattle, WA (US); Wonsuk Jung, Seattle, WA (US); Drexel Alexander Feeling, Durham, NC (US); Patrick J. Neill, Sammamish, WA (US); Kimberly Ha, Seattle, WA (US); Gregory Cannon, Seattle, WA (US); Yelena Zukin, Foster City, CA (US); Zong Ye Yang, Pasadena, CA (US); Pablo Federico Majernik, Sammamish, WA (US)

(73) Assignee: Google LLC, Mountain View, CA (US)

( * ) Notice: Subject to any disclaimer, the term of this patent is extended or adjusted under 35 U.S.C. 154(b) by 127 days.

(21) Appl. No.: 18/234,160

(22) Filed: Aug. 15, 2023

(65) Prior Publication Data

US 2025/0063141 A1 Feb. 20, 2025

(51) Int. Cl.
*H04N 7/15* (2006.01)
*G06T 7/20* (2017.01)

(52) U.S. Cl.
CPC ............... *H04N 7/157* (2013.01); *G06T 7/20* (2013.01); *H04N 7/152* (2013.01); *H04N 7/155* (2013.01)

(58) Field of Classification Search
None
See application file for complete search history.

(56) References Cited

U.S. PATENT DOCUMENTS

| 9,547,412 B1 * | 1/2017 | Dillon ..................... G06F 3/012 |
| 2005/0197138 A1 * | 9/2005 | Kaminsky ......... H04M 1/72457 |
| | | 455/456.1 |
| 2009/0254004 A1 | 10/2009 | Graichen et al. |

(Continued)

OTHER PUBLICATIONS

Bradshaw, "Google Meet readies 'On-the-Go' mode to minimize distractions while walking," 9to5Google, Jun. 9, 2023, 10 pages. https://9to5google.com/2023/06/09/google-meet-on-the-go-walking-mode/.

(Continued)

*Primary Examiner* — Hemant S Patel
(74) *Attorney, Agent, or Firm* — Lowenstein Sandler LLP

(57) ABSTRACT

A method for adjusting the user interface for a video conferencing application is provided. The method includes receiving an indication of a motion of a first client device of a first participant of a plurality of participants of a virtual meeting. The method further includes determining, based on the indication of the motion of the first client device of the first participant, a set of interface adjustments for a virtual meeting user interface to be presented on the first client device of the first participant. The method further includes causing the virtual meeting user interface presented on the first client device of the first participant to reflect the set of user interface adjustments during the virtual meeting.

20 Claims, 13 Drawing Sheets

(56) References Cited

U.S. PATENT DOCUMENTS

| | | | |
|---|---|---|---|
| 2010/0182141 A1* | 7/2010 | Yoon | B60W 40/09 |
| | | | 340/439 |
| 2010/0317371 A1* | 12/2010 | Westerinen | H04M 1/72451 |
| | | | 455/456.6 |
| 2015/0025891 A1 | 1/2015 | Goldberg et al. | |
| 2019/0222805 A1 | 7/2019 | Barkley et al. | |
| 2022/0171875 A1* | 6/2022 | Jasleen | G06F 21/6245 |
| 2025/0028442 A1* | 1/2025 | Macdonald | G06F 9/451 |

OTHER PUBLICATIONS

Veenstra, "Record Teams meetings and now quickly find the recordings," SharePains, Dec. 5, 2018, 13 pages. https://sharepains.com/2018/12/05/record-meetings-find-recordings-teams/.

* cited by examiner

US 12,549,684 B2

ADJUSTING A USER INTERFACE OF A VIRTUAL MEETING BASED ON A PARTICIPANT MOTION

TECHNICAL FIELD

The present disclosure is generally related to virtual meetings, and more particularly to adjusting a user interface of a virtual meeting based on a participant motion.

BACKGROUND

Virtual meetings can take place between multiple participants via a platform (e.g., a virtual meeting platform) and can serve as virtual gathering where participants can share communications data with each other via a virtual meeting user interface presented on a user device of each participant. In some instances, the shared communications data can be audio data (e.g., a voice of a user recorded via a microphone), video data (e.g., a video captured by a camera depicting a participant and/or a screen image of a client device) textual data (e.g., documents, hyperlinks, and/or written notes or impressions associated with a chat feature provided by the platform during the virtual meeting), and so forth. In some instances, a virtual meeting user interface can include certain features that are beneficial in some situations but may affect participant ability to communicate in real-time in other situations. For example, users that are driving nay have limited ability to look at the screen showing the video feed of meeting participants and reduced ability to hist small button. In another example, users that are on a train may have loud background noise that makes it hard for them to communicate.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to one aspect of the present disclosure, a method is provided. The method includes receiving an indication of a motion of a first client device of a first participant of a plurality of participants of a virtual meeting, and determining, based on the indication of the motion of the first client device of the first participant, whether the motion of the first client device of the first participant corresponds to a motion type of a plurality of motion types that are each associated with a different virtual meeting user interface. The method further includes responsive to determining that the motion of the first client device of the first participant corresponds to the motion type of the plurality of motion types, identifying, based on the motion type, a set of interface adjustments for a virtual meeting user interface to be presented on the first client device of the first participant, and causing the virtual meeting user interface presented on the first client device of the first participant to reflect the set of user interface adjustments during the virtual meeting.

BRIEF DESCRIPTION OF THE DRAWINGS

The present disclosure is illustrated by way of examples, and not by way of limitation, and may be more fully understood with references to the following detailed description when considered in connection with the figures, which are described below.

DETAILED DESCRIPTION

Figure 1:
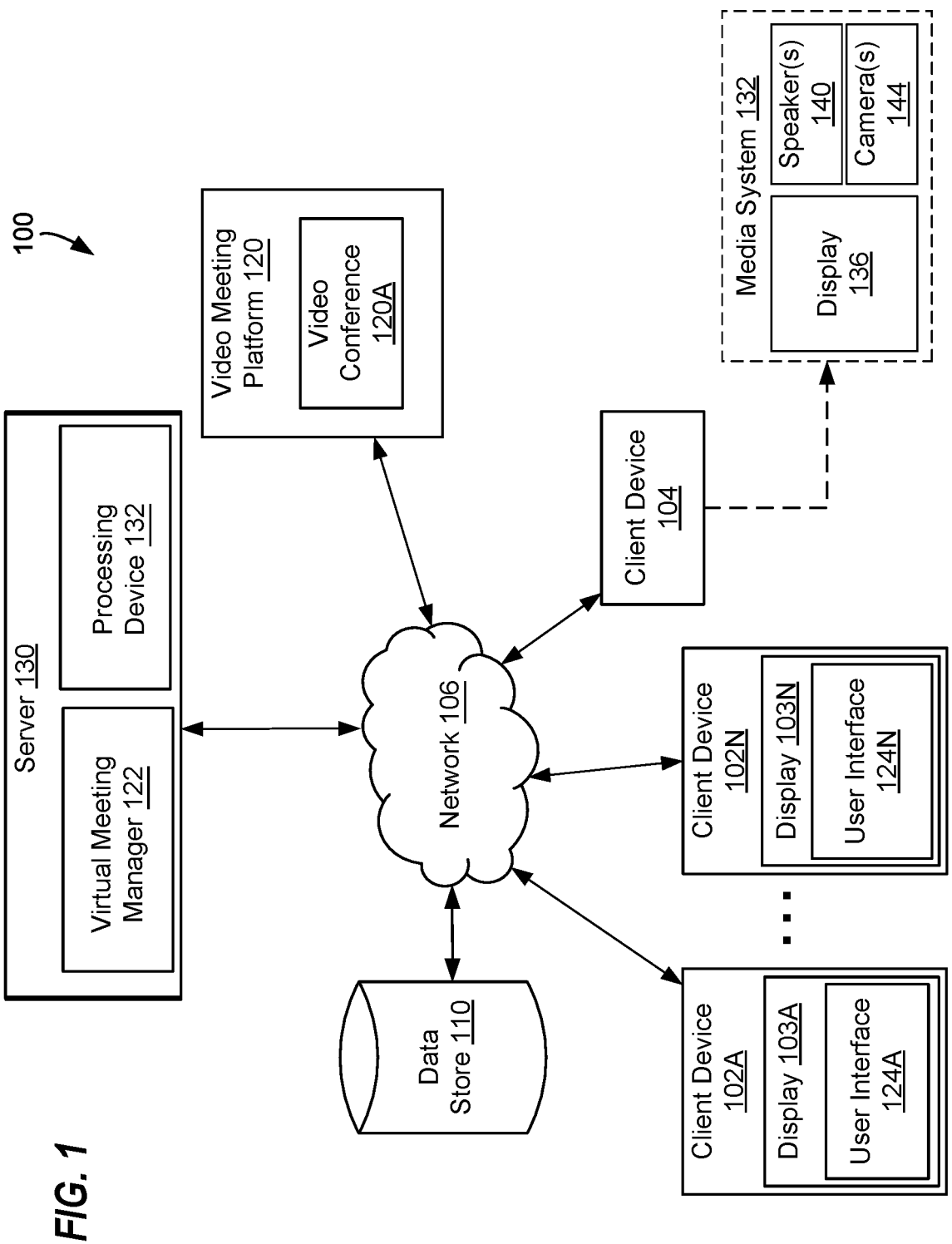
FIG. 1 illustrates an example system architecture capable of supporting a virtual meeting and including an example processing device, in accordance with implementations of the present disclosure.

Aspects of the disclosure relate to adjusting a user interface of a virtual meeting based on a participant motion. A virtual meeting platform can enable virtual meetings between multiple participants via respective client devices that are connected over a network and share each other's audio data (e.g., voice of a user recorded via a microphone of a client device) and/or video data (e.g., a video captured by a camera of a client device) during a virtual meeting (e.g., a a video conference, a conference call, etc.). In some instances, a virtual meeting platform can enable a significant number of client devices (e.g., up to one hundred or more client devices) to be connected via the virtual meeting.

A participant of a virtual meeting can speak (e.g., present on a topic) to the other participants of the virtual meeting. Some existing virtual meeting platforms can provide a user interface (UI) (e.g., virtual meeting UI) to each client device participating in the virtual meeting. The UI presents the video streams received from the client devices over the network in a set of regions in the UI. For example, the video stream of a participant who is speaking to the other participants in the virtual meeting can be presented in a designated, often larger, region of the UI of the virtual meeting platform, and other participants who are not speaking can be presented in other, often smaller, regions.

Current virtual meeting platforms typically provide the same virtual meeting UI to all participants of the virtual meeting. However, the participants may be in different situations/environments during the virtual meeting and as such may have different situational impairments that can affect their ability to communicate in real-time. For example, participants who are driving may have limited ability to look at the screen and reduced ability to hit small buttons. Participants that are on a train may have loud background noise that can make it hard for them to communicate. Current virtual meeting platforms typically do not take into consideration changes in participants' abilities to communicate and interact with a real-time virtual meeting user interface based on current capabilities and situational impairments the participants face due to the situations/environments they are in. As a result, participants who are not currently present in an office environment (e.g., are currently driving, are on a bus, train or plane, are in a public place, etc.) may not be able to be fully engaged in the virtual meeting, which can create a need for other participants to repeat their questions, explanations, etc. This may increase the duration of the virtual meeting, resulting in consumption of additional computing resources, and leading to a larger amount of computing resources to be unavailable to other processes. Further, presenting the same virtual meeting user interface to all participants, regardless of their situations/environments, can render such virtual meetings ineffective and often overlooked as a resource for real-time communication by users who are traveling and/or are away from their office environments.

Aspects of the disclosure address the above and other deficiencies by adjusting a user interface of a virtual meeting based on a participant motion. In particular, a virtual meeting platform and/or a virtual meeting client application can detect a participant's motion and determine that the participant's motion indicates that the current environment of the participant is outside of the participant's home or workplace (e.g., that the participant is currently driving, is on a bus, train or plane, is in a public place, etc.). The detection of the motion and the determination that the motion indicates that the current environment of the participant is outside of the participant's home or workplace (rather than the participant's walking to another room in their home or to another office at their workplace) can be performed using signals from the client device of the participant, including, for example, accelerometer data, Wi-Fi connectivity strength, audio and video feeds, data indicating connectivity of the client device to other devices via a wireless radio technology (e.g., Bluetooth) or a cable, location data (e.g., GPS data), etc. In some embodiments, other factors such as the duration of motion and/or speed of movement can be also used to determine that the motion indicates that the current environment of the participant is outside of the participant's home or workplace.

Upon determining that the participant's motion indicates that the current environment of the participant is outside of the participant's home or workplace, a virtual meeting user interface on the participant's client device can be modified or replaced with an optimized virtual meeting user interface. In some embodiments, this change or replacement can be done automatically (without any user input). In other embodiments, the participant can be presented with a prompt suggesting to select an update mode associated with the modified or replaced virtual meeting user interface, and upon the participant's selection of the update mode, the virtual meeting user interface on the participant's client device can be modified or replaced with an optimized virtual meeting user interface. In some embodiments, the participant is presented with the optimized virtual meeting user interface while the other participants are presented with unmodified virtual meeting user interfaces. In some embodiments, the participant's interactions pertaining to the update mode and/or the modified or replaced virtual meeting user interface (e.g., selecting the update mode, exiting the optimized virtual meeting user interface, etc.) can be recorded to learn user preferences and/or to perform a more personalized determination of what types of motion is meaningful for the participant and would benefit from an optimized interface.

The modified or replaced virtual meeting user interface can include user interface adjustments such as adjustments to size and/or placement of one or more user interface elements (e.g., user interface buttons considered important), and/or removal of one or more user interface elements (e.g., removal of supplemental materials being presented or visual items representing video streams of participants) to create a more focused user interface. In some embodiments, the user interface adjustments can include addition of audio cues and/or narration for certain virtual meeting events such as chat messages and virtual meeting recordings, addition of captions and/or transcripts (e.g., to help participants who are in subway to catch up on content that they may not have heard), addition of text-to voice communications (e.g., to help participants in certain situations who do not have the ability to speak), etc. In some embodiments, the user interface adjustments can include addition of an avatar to speak on a participant's behalf (e.g., a participant can type and have their own photo-realistic avatar to speak on their behalf).

In some embodiments, upon determining that the participant's motion indicates that the current environment of the participant is outside of the participant's home or workplace, some features of the participant's client device can be changed depending on the type of the participant's motion. For example, if the participant is determined to be driving, a different type of noise filtering can be used for the virtual meeting that is better suited for higher performance and optimized for that type of commute.

As indicated above, aspects of the present disclosure cover techniques that can adjust a user interface of a virtual meeting based on a participant motion. As a result, participants who are not currently present in an office environment (e.g., are currently driving, are on a bus, train or plane, are in a public place, etc.) can be fully engaged in the virtual meeting, eliminating the need for other participants to repeat their questions, explanations, etc. As the duration of the virtual meeting is reduced, the amount of computing resources consumed by the platform and/or the client devices connected to the platform is also reduced. Such resources are therefore available to other processes (e.g., at the platform and/or the client devices), which can decrease an overall latency and increase an overall efficiency of the system.

It can be noted that aspects of disclosure are discussed in terms of a participant representing a real-word person. In some embodiments, the participant can be an avatar, such as an avatar in a three-dimensional (3D) environment that represents a real-world person.

FIG. 1 illustrates an example system architecture 100 capable of supporting a virtual meeting and including an example processing device 102, in accordance with implementations of the present disclosure. The system architecture 100 ("system 100") includes client devices 102A-N, one or more client devices 104, a data store 110, a virtual meeting platform 120, and a server 130, each connected to a network 106.

In some embodiments, network 106 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Network 106 may be or include one or more devices and technologies that facilitates communication between devices within system 100. Network 106 can include one or more of the following: routers, switches, hubs, modems, network interface cards (NICs), Wireless Access Points (WAPs), firewalls, network attached storage (NAS), print servers, proxy servers, load balancers, and domain name system (DNS) Servers. In some embodiments, network 106 is configured to facilitate the audio/visual transmission for a video-conferencing application stored on server 130, between server 130 and client devices 102(A)-(N).

In some implementations, data store 110 is a persistent storage that is capable of storing data as well as data structures to tag, organize, and index the data. A data item can include audio data and/or video stream data, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by virtual meeting platform 120 or one or more different machines (e.g., the server 130) coupled to the virtual meeting platform 120 via network 104. In some implementations, the data store 110 can store portions of audio and video streams received from the client devices 102A-102N for the virtual meeting platform 120. Moreover, the data store 110 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents may be shared with users of the client devices 102A-102N and/or concurrently editable by the users. In some implementations, the data store 110 can store one or more user interaction events received from the client devices 102A-102N as described in more detail with respect to FIG. 3.

Virtual meeting platform 120 can enable users of client devices 102A-102N and/or client device(s) 104 to connect with each other via a virtual meeting (e.g., a virtual meeting 120A). A virtual meeting (also referred to herein as a "live stream of a virtual meeting") refers to a real-time communication session such as a virtual meeting, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Virtual meeting platform 120 can allow a user to join and participate in a virtual meeting with other users of the platform. Embodiments of the present disclosure can be implemented with any number of participants connecting via the virtual meeting (e.g., up to one hundred or more).

The client devices 102A-102N may each include computing devices such as personal computers (PCs), laptops, mobile phones, smart phones, tablet computers, netbook computers, network-connected televisions, etc. In some implementations, client devices 102A-102N may also be referred to as "user devices." Each client device 102A-102N can include an audiovisual component that can generate audio and video data to be streamed to virtual meeting platform 120. In some implementations, the audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 102A-102N. In some implementations, the audiovisual component can also include an image capture device (e.g., a camera) to capture images and generate video data (e.g., a video stream) of the captured data of the captured images.

In some embodiments, client devices 102A-102N can include computing devices such as a virtual reality (VR) headset or augmented reality (AR) headset. A VR/AR headset can include a wearable device designed to immerse users in digital environments and experiences. In some embodiments, a VR headset can use one or more of one or more cameras, one or more projectors, gyroscopes and other sensors to immerse the user in a three-dimensional (3D) environment. A VR headset can include a head-mounted display with a screen for each eye. The VR headset can include motion tracking sensors to detect head and eye movements. In some embodiments, an AR headset can overlay digital content on real-world features and allow users to see and interact with both virtual objects and the surrounding physical environment simultaneously. AR headsets can include transparent or semi-transparent displays that can allow users to maintain awareness of the surrounding physical environment while interacting with digital content.

In some embodiments, virtual meeting platform 120 is coupled, via network 104, with one or more client devices 104 that are each associated with a physical conference or meeting room. Client device(s) 104 may include or be coupled to a media system 132 that may comprise one or more display devices 136, one or more speakers 140 and one or more cameras 144. Display device 136 can be, for example, a smart display or a non-smart display (e.g., a display that is not itself configured to connect to network 104). Users that are physically present in the room can use media system 132 rather than their own devices (e.g., client devices 102A-102N) to participate in a virtual meeting, which may include other remote users. For example, the users in the room that participate in the virtual meeting may control the display 136 to show a slide presentation or watch slide presentations of other participants. Sound and/or camera control can similarly be performed. Similar to client devices 102A-102N, client device(s) 104 can generate audio and video data to be streamed to virtual meeting platform 120 (e.g., using one or more microphones, speakers 140 and cameras 144).

Each client device 102A-102N or 104 can include a web browser and/or a client application (e.g., a mobile application, a desktop application, etc.). In some implementations, the web browser and/or the client application can present, on a display device 103A-103N of client device 102A-102N, a user interface (UI) (e.g., a UI of the UIs 124A-124N) for users to access virtual meeting platform 120. For example, a user of client device 102A can join and participate in a virtual meeting via a UI 124A presented on the display device 103A by the web browser or client application. A user can also present a document to participants of the virtual meeting via each of the UIs 124A-124N. Each of the UIs 124A-124N can include multiple regions to present visual items corresponding to video streams of the client devices 102A-102N provided to the server 130 for the virtual meeting.

Client devices 102(A)-102(N) may be or include one or more portable electronic devices designed to enable users to access, process, and interact with various digital content and services. In some embodiments, one or more of client devices 102(A)-102(N) are smartphones. In other embodiments, one or more of client devices 102(A)-102(N) are other electronic devices (e.g., laptops, wearables, desktop computers, smart watches, smart glasses, smart home devices, tablets, etc.). Client devices 102(A)-102(N) may be configured to perform a variety of functions (e.g., run various applications, access the internet, communicate with other devices, facilitate home automation, etc.).

In some implementations, server 130 can include a virtual meeting manager 122. Virtual meeting manager 122 is configured to manage a virtual meeting between multiple users of virtual meeting platform 120. In some implementations, virtual meeting manager 122 can provide the UIs 124A-124N to each client device to enable users to watch and listen to each other during a live stream of a virtual meeting and/or during playback of a recording of the virtual meeting. Virtual meeting manager 122 can also collect and provide data associated with the virtual meeting to each participant of the video conference. In some implementations, virtual meeting manager 122 can provide the UIs 124A-124N for presentation by a client application (e.g., a mobile application, a desktop application, etc.). For example, the UIs 124A-124N can be displayed on a display device 103A-103N by a native application executing on the operating system of the client device 102A-102N or the client device 104. The native application may be separate from a web browser. In some embodiments, the virtual meeting manager 122 can adjusting a user interface of a virtual meeting based on a participant motion. Further details with respect to the virtual meeting manager 122 are described with respect to FIG. 2.

As described previously, an audiovisual component of each client device can capture images and generate video data (e.g., a video stream) of the captured data of the captured images. In some implementations, the client devices 102A-102N and/or client device(s) 104 can transmit the generated video stream to virtual meeting manager 122. The audiovisual component of each client device can also capture an audio signal representing speech of a user and generate audio data (e.g., an audio file or audio stream) based on the captured audio signal. In some implementations, the client devices 102A-102N and/or client device(s) 104 can transmit the generated audio data to virtual meeting manager 122.

In some implementations, virtual meeting platform 120 and/or server 130 can be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a virtual meeting. Virtual meeting platform 120 may also include a website (e.g., a webpage) or application back-end software that may be used to enable a user to connect with other users via the virtual meeting.

It should be noted that in some other implementations, the functions of server 130 or virtual meeting platform 120 may be provided by a fewer number of machines. For example, in some implementations, server 130 may be integrated into a single machine, while in other implementations, server 130 may be integrated into multiple machines. In addition, in some implementations, server 130 may be integrated into virtual meeting platform 120.

In general, functions described in implementations as being performed by virtual meeting platform 120 or server 130 can also be performed by the client devices 102A-N and/or client device(s) 104 in other implementations, if appropriate. In addition, the functionality attributed to a particular component can be performed by different or multiple components operating together. Virtual meeting platform 120 and/or server 130 can also be accessed as a service provided to other systems or devices through appropriate application programming interfaces, and thus is not limited to use in websites.

Although implementations of the disclosure are discussed in terms of virtual meeting platform 120 and users of virtual meeting platform 120 participating in a virtual meeting, implementations may also be generally applied to any type of telephone call or conference call between users. Implementations of the disclosure are not limited to virtual meeting platforms that provide virtual meeting tools to users.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the virtual meeting platform 120.

In situations in which the systems discussed here collect personal information about users, or may make use of personal information, the users may be provided with an opportunity to control whether virtual meeting platform 120 collects user information (e.g., information about a user's social network, social actions or activities, profession, a user's preferences, or a user's current location), or to control whether and/or how to receive content from the server 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the virtual meeting platform 120 and/or server 130.

Figure 2:
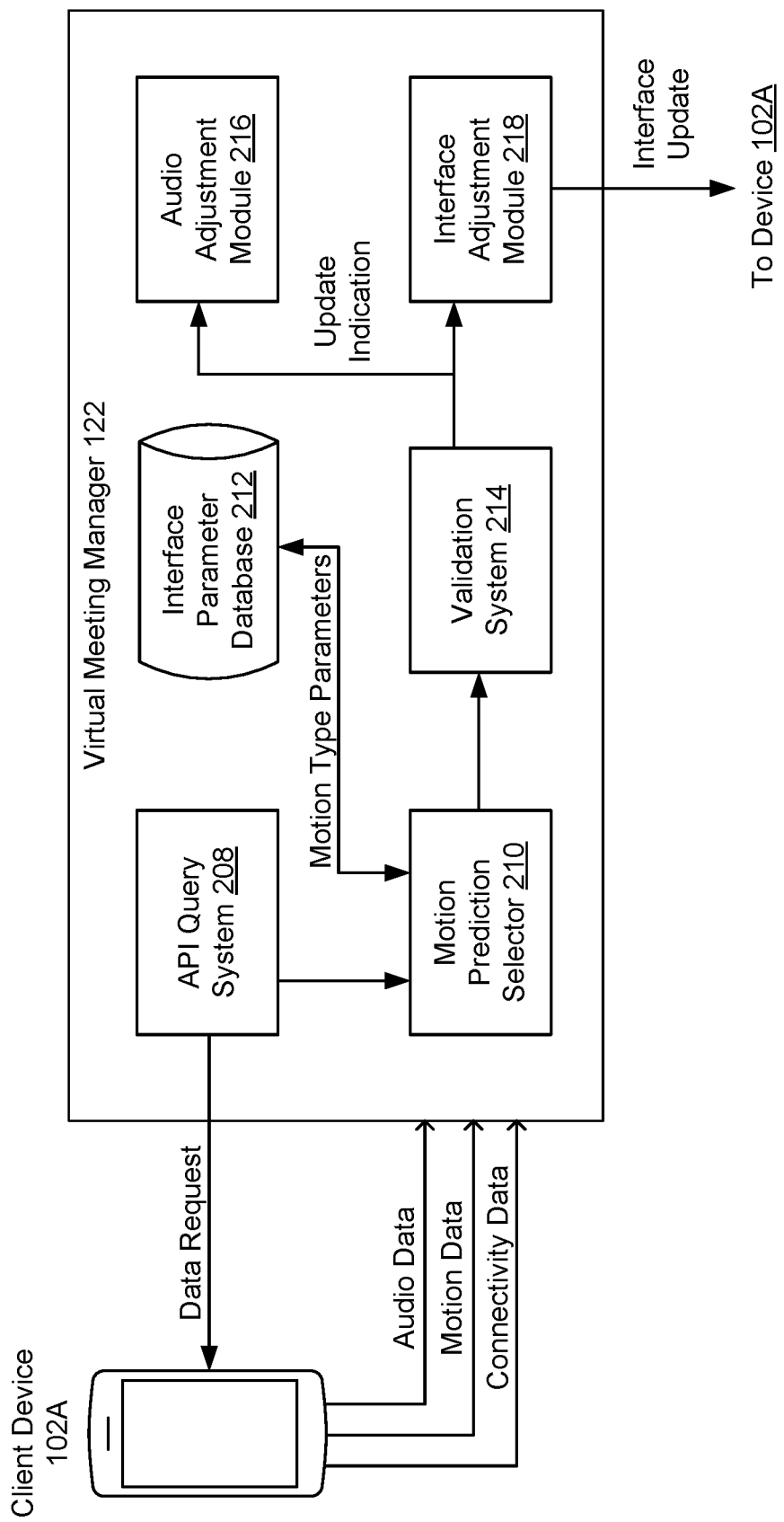
FIG. 2 is a block diagram of an example virtual meeting manager, according to some embodiments.

FIG. 2 is a block diagram illustrating an example virtual meeting manager 122, in accordance with embodiments of the disclosure. Virtual meeting manager 122 can receive data from client device 102A (e.g., from an app hosted by client device 102A) and cause the user interface of the app to be updated based on the data. In one example, virtual meeting manager 122 receives data regarding the user device 122, and uses it to determine if and what type of motion client device 102A is engaged in. Virtual meeting manager 122 can then cause the user interface to be adjusted (e.g., by removing video feed of other meeting members, increasing button sizes, etc.) of client device 102A for safety reasons and participant convenience.

In some embodiments, virtual meeting manager 122 includes API query system 208, motion prediction selector 210, interface parameter database 212, validation system 214, audio adjustment module 216, interface adjustment module 218.

API query system 208 may be configured to request and/or query data from user devices that are running the application (e.g., client device 102A). For example, API query system 208 may be configured to request motion data from client device 102A. In some embodiments, motion data can be or include the speed of client device 102A in real time (e.g., via the accelerometer in the device, etc.), the location (GPS data) of client device 102A, or other data relating to the location and/or motion of client device 102A. In some embodiments, API query system 208 is configured to request audio/video (A/V) data and/or permissions from client device 102A. Requesting A/V permissions from a smartphone device may generally involve using the relevant APIs provided by the mobile operating system to request permission to access A/V data. In some embodiments, API query system 208 is configured to request connectivity data and/or permissions (e.g., connection to virtual meetings, meetings with other uses of the application, data relating to connection strength, etc.) from client device 102A. Client device 102A may then accept the permissions and provide some or all of the data described above to API query system 208. In some embodiments, API query system 208 provides motion data to motion prediction selector 210 for further analysis.

As described herein, the various types of data (e.g., motion data, audio data, video data, connectivity data, etc.), or a combination thereof, may be referred to as operation data or operational data. In some embodiments, operational data is data relating to the operation of client device 102A (or another user device that is connected to server 130 and is using the application) that is queried and/or received by server 130 that is indicative of relevant circumstances for audio and/or video calls. As noted above, this can include accelerometer data, Wi-Fi connectivity strength, audio and video feeds, and other types of data.

Motion prediction selector 210 may be configured to receive motion data from client device 102A and determine a type of motion of client device 102A. In some embodiments, server 130 has a variety of parameters (e.g., stored in interface parameter database 212) relating to the different types of motion that client device 102A could currently be operating therein and uses the device data in conjunction with the parameters to make the determination. For example, interface parameter database 212 may include metrics that a "walking" motion is between 2-5 miles per hour (mph). Motion prediction selector 210 uses this data and the received data from client device 102A to determine if the user of client device 102A is walking. Example types of motion could be or include any of the following: walking, running, cycling, driving, riding a bus, skating, flying, boating, hiking, skiing.

In some embodiments, motion prediction selector 210 may not be needed, and virtual meeting manager 122 can determine that client device 102A is in a particular type of motion based on other data (e.g., connectivity data). For example, when a user connects client device 102A to a vehicle's Bluetooth system, virtual meeting manager 122 can detect this connection (e.g., via an in-car infotainment system connected to the application, etc.) and understand that client device 102A is in motion in a vehicle.

Interface parameter database 212 may store a variety of data relating to the determination of certain types of motion and the adjustments to user interfaces in accordance to those determined types of motion. As shown in FIG. 2, motion prediction selector 210 queries interface parameter database 212 for data. For example, audio adjustment module 216 may query interface parameter database 212 to determine what audio adjustments should be made for a "walking" motion, and, in response to receiving this information, audio adjustment module 216 can then prepare an update signal to provide to user device 112 for the interface update.

Motion prediction selector 210 may "predict" the type of motion in a variety of ways. In some embodiments, motion prediction selector 210 predicts the type of motion using a trained machine learning model, which can be implemented using various types of models, training techniques, and reinforcement techniques. One example is provided below, but this is merely meant to be exemplary, and the model selection or implementation thereof should not be considered limiting.

Motion prediction selector 210 may implement a convolutional neural network (CNN) to recognize the type of motion based on the operation data. The CNN can be trained using operation data of various user devices (e.g., client device 102A, etc.), which includes accelerometer readings, timestamp readings, and corresponding activity labels. This could be done by monitoring varying people using the user devices and collecting data from each device when they are performing each type of motion. After data has been collected, the data can be labeled with the appropriate motion type. In one example, the data could be divided into segments based on time intervals (e.g., 10 seconds) and each segment can be labeled as a type of motion (e.g., segment A was when they were walking, segment B was when they were on a bus, etc.).

Motion prediction selector 212 then pre-processes the data by normalizing and/or removing noisy data. The operation data could then be split into a training set (e.g., 80% of the data) and a testing set (e.g., 20% of the data). Motion prediction selector 212 then trains the CNN using the training set so that the CNN can recognize patterns for which type of motion is associated with sets of the operation data. After a training period, the CNN can be used to classify different types of motion based on the sets of operation data. After the model is trained, motion prediction selector 212 can use the testing data to assess performance. The CNN may then be used during a current virtual meeting and can receive the operation data for client device 102A as described above.

Validation system 214 may be configured to validate the decision made by motion selector 210, according to some embodiments. Validation system 214 may be necessary in instances where motion prediction selector 210 decides that is technically correct for that instance in time but is not practically correct for the user operating client device 102A. In the event validation system 214 determines that sufficient motion is occurring that warrants an interface update, validation system 214 can provide an update indication to audio adjustment module 216, interface adjustment module 218, or a combination thereof.

In one example, a user can activate an option or setting for allowing virtual meeting user interface updates when motion is detected. For example, the user can activate this option and enter a virtual meeting with other participants. The user, with client device 102A in hand, can then stand up from their desk and walk 40 paces (which takes about 30 seconds) to the cafeteria and sit down. During that transit period, motion prediction selector may have determined that client device 102A is in transit, specifically walking, which may require an interface update. However, validation system 214 may be used, in this example, to only make the final determination that a user is walking if the device data is indicative of motion in the range of walking (e.g., 2-5 mph, etc.) for a certain period (e.g., 3 minutes). In the above example, the data from client device 102A would not meet this threshold, and therefore validation system 214 would determine that the prediction from motion prediction selector 210 was a false positive. Validation system 214 would therefore not provide an update indication to audio adjustment module 216 or interface adjustment module 218.

Audio adjustment module 216 may be configured to prepare update packages for the audio component of the application interface for client device 102A. For example, audio adjustment module 216 may query interface parameter database 212 for appropriate audio updates when a determination has been made that the user of user device 212 is driving. The queried data may indicate that audio received by client device 102A within the application be decreased by 5 decibels (dBs). Audio adjustment module 216 may then package an update signal accordingly and provide the update signal to client device 102A. Other types of audio adjustments are also considered, including volume increases (e.g., of other participants, of the user themselves for the other participants, etc.), muting of certain participants also using the application, and selective muting of background noise (e.g., if the user is on the bus, the background noise on the bus is muted, etc.). In some embodiments, no audio adjustments are made after a type of motion is determined, and audio adjustment module 216 is not required to provide an audio update to client device 102A.

Figure 3:
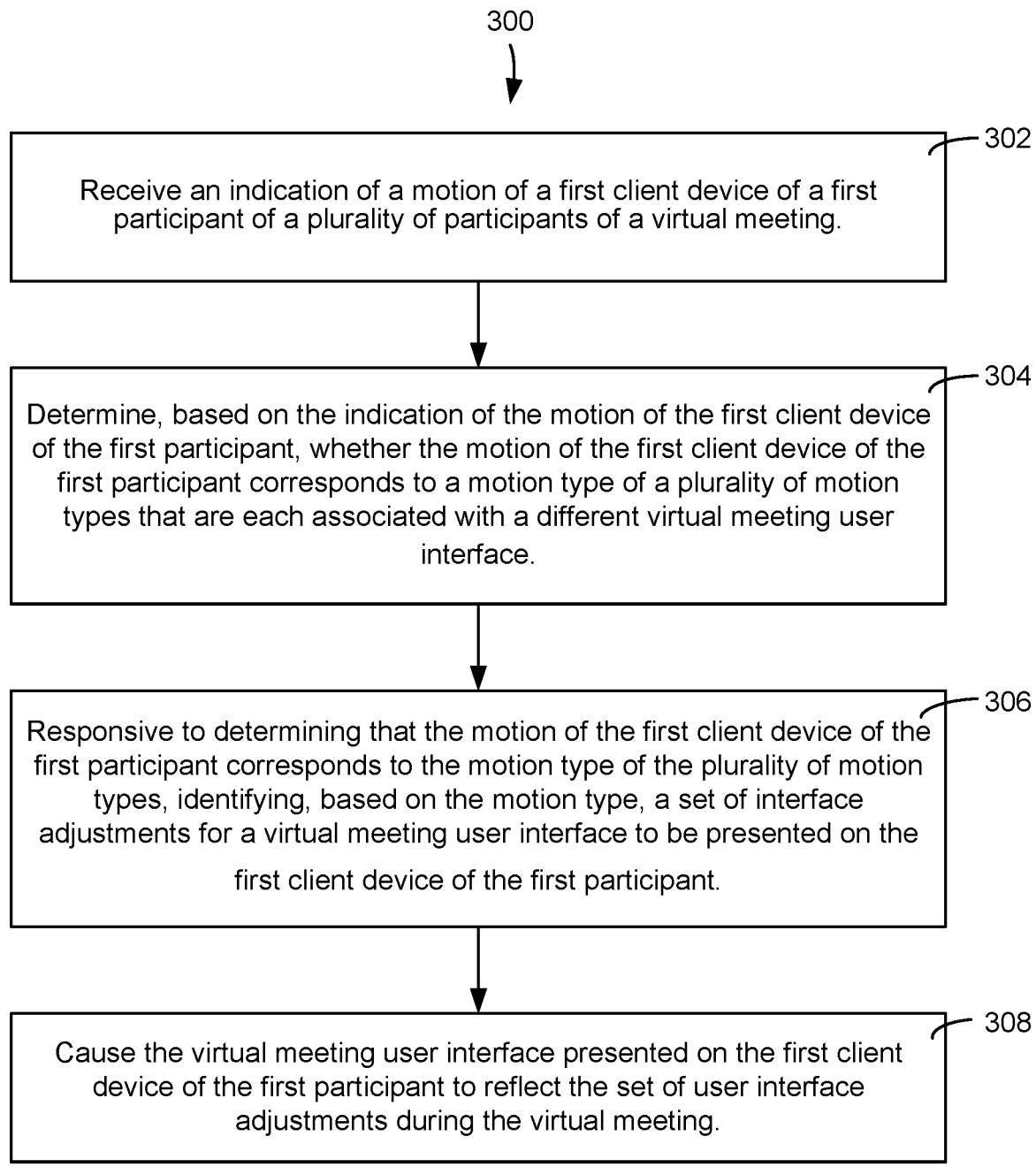
FIG. 3 is a flow diagram of an example method for adjusting a user interface of a virtual meeting based on a participant motion, according to some embodiments.

Referring now to FIG. 3, a flow diagram of a process 300 for updating the user interface based on device data is shown, according to some embodiments. Process 300 may be performed by server 130, in whole or in part, as described above with reference to FIG. 2. For example, process 300 may be performed by processing device 132 and the various components therein.

Process 300 is shown to include receiving an indication of a motion of a first client device of a first participant of a plurality of participants of a virtual meeting (step 302). In some embodiments, client device 102A provides the operation data to communications interface 222. In some embodiments, this is done after the application receives permission (e.g., via a pop-up window on the application, etc.) to obtain operation data in real-time. In such embodiments, the permission may be requested because the application wants to enter a mode in which the interface of the application can be updated, in response to the application determining that the user is in motion (based on the operational data).

Process 300 is shown to include determining, based on the indication of the motion of the first client device of the first participant, a set of interface adjustments for a virtual meeting user interface to be presented on the first client device of the first participant. (step 304). In some embodiments, motion prediction selector 210 determines a type of motion based on the operation data. As described above with reference to FIG. 2, this can be done a variety of ways, including using a neural network to classify the type of motion based on the operation data (see FIG. 2 above for more detail). The interface adjustments may be predicted based on machine learning (e.g., when walking is determined, make a prediction as to the optimal interface for people when they are walking, etc.). In other embodiments, the interface adjustments are pre-mapped to the determined type of motion (e.g., every time walking is determined, remove video feed and make buttons larger on the interface, etc.). In some embodiments, motion prediction selector 210 is responsible for determining the set of interface adjustments. In other embodiments, as noted above with reference to FIG. 2, audio adjustment module 216 or interface adjustment module 218 may be responsible for determining the set of interface adjustments.

Process 300 is shown to include causing the virtual meeting user interface presented on the first client device of the first participant to reflect the set of user interface adjustments during the virtual meeting. (step 308) and providing the update signal to the user device (step 310). In some embodiments, interface adjustment module 218 generates a signal or pack required to update the interface. This update can include removing the display of the video feed of the user during a video conferencing call, removing the display of the video feed of the other participants in the video conference, increasing or decreasing button size, changing the colors displayed on the interface, increasing or decreasing the audio feed provided from the user to the other participants, increasing or decreasing the audio feed provided to the user from the other participants, or any combination thereof. Various embodiments of updating the interface on client device 102A are described in detail below with reference to FIGS. 6A-10.

Figure 4:
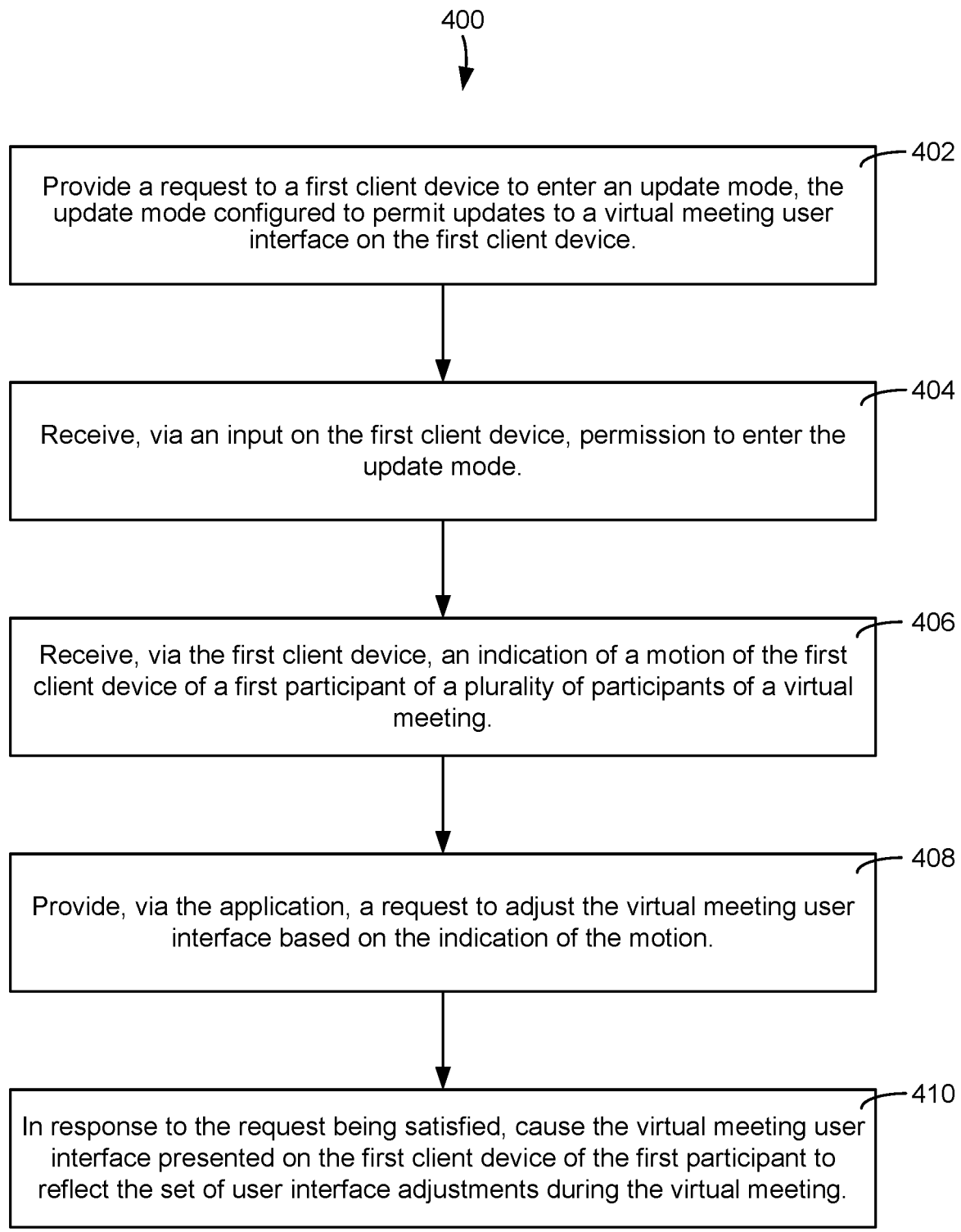
FIG. 4 is a flow diagram of an example method for switching a client device of a participant of an update mode, according to some embodiments.

Referring now to FIG. 4, a flow diagram of a process 400 for receiving user requests and providing responses is shown, according to some embodiments. Process 400 may be performed by server 130, in whole or in part, as described above with reference to FIG. 2. For example, process 400 may be performed by processing device 132 and the various components therein.

Figure 7:
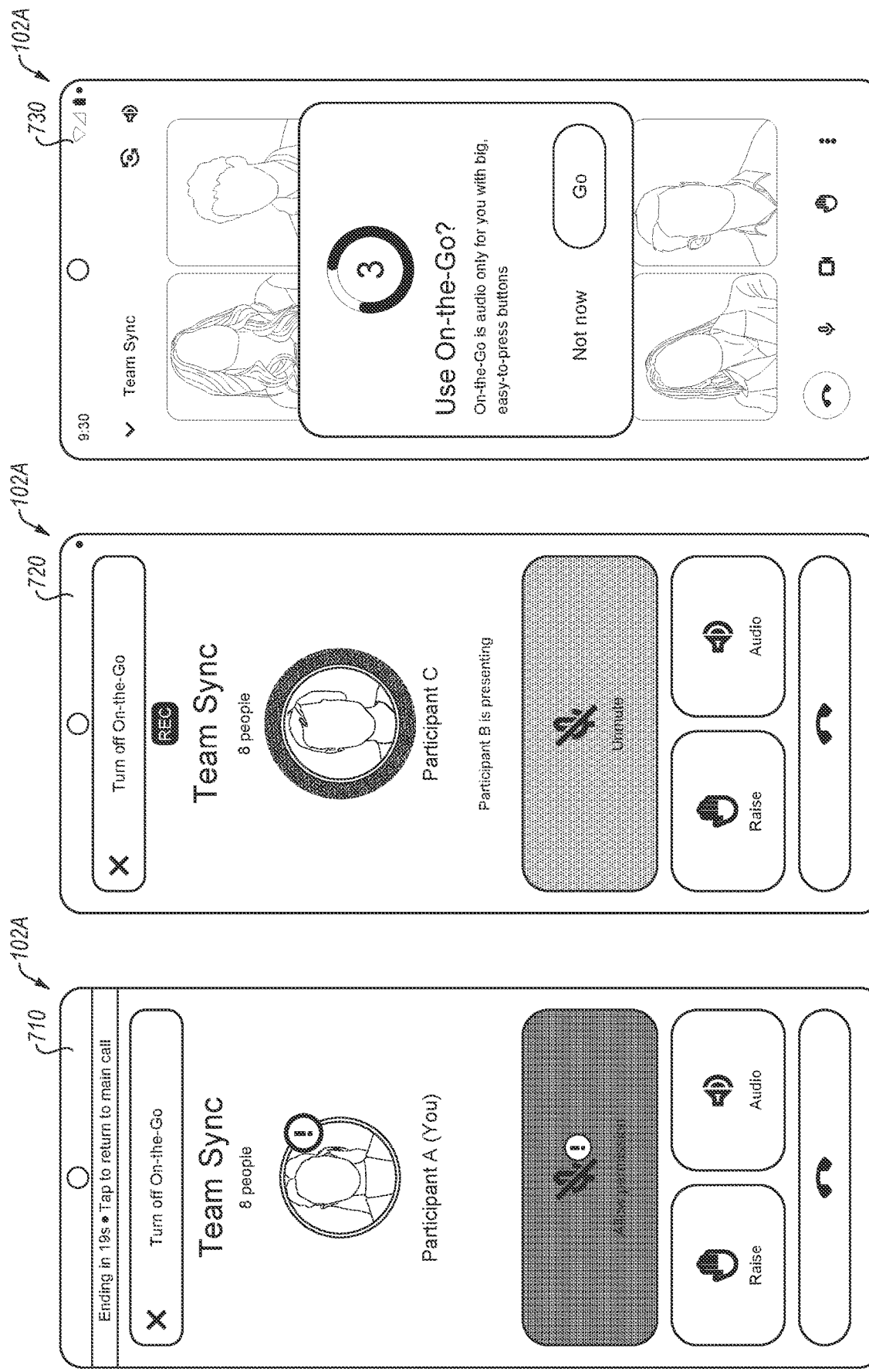
FIG. 7 illustrates example user interfaces (UIs) of a virtual meeting, in accordance with implementations of the present disclosure, according to some embodiments.

Process 400 is shown to include providing, via an application operating on a user device, a request to enter an update mode, the update mode configured to permit updates to a user interface of the application displayed on the user device (step 402). In some embodiments, the user may be prompted with a request to enter an "Update mode." An update mode, as referred to herein, may refer to any type of mode where the application can update the parameters of a interface, if the user permits entrance into the mode. An exemplary embodiment of this step is shown in FIG. 7.

Process 400 is shown to include receiving, via an input on the user device, permission to enter the update mode (step 404). In some embodiments, the user can select to enter the update mode or not. When the user chooses to not enter the update mode, the application may be restricted from updating the interface in response to determinations of specific types of movement.

Process 400 is shown to include receiving, via the user device, operation data relating to motion of the user device (step 406). In some embodiments, client device 102A provides the operation data to communications interface 222. In some embodiments, this is done after the application receives permission (e.g., via a pop-up window on the application, etc.) to obtain operation data in real-time. In such embodiments, the permission may be requested because the application wants to enter a mode in which the interface of the application can be updated, in response to the application determining that the user is in motion (based on the operational data).

Process 400 is shown to include providing, via the application, a request to adjust the user interface based on the operation data (step 408). In some embodiments, the user may be prompted to permit the interface update prior to the adjustments being made. For example, once server 130 determines that the user is walking with client device 102A, server 130 may send a prompt to client device 102A asking the user for permission to update the interface.

Process 400 is shown to include, in response to the request being satisfied, updating the user interface presented on the user device using the update signal (step 410). The user may provide a user input (e.g., pressing a button, etc.), giving permission to permit server 130 to update the interface on client device 102A. While process 400 provides an exemplary embodiment of the user being presented with a prompt to provide permission, a prompt requesting permission may not be provided in other embodiments.

Figure 5:
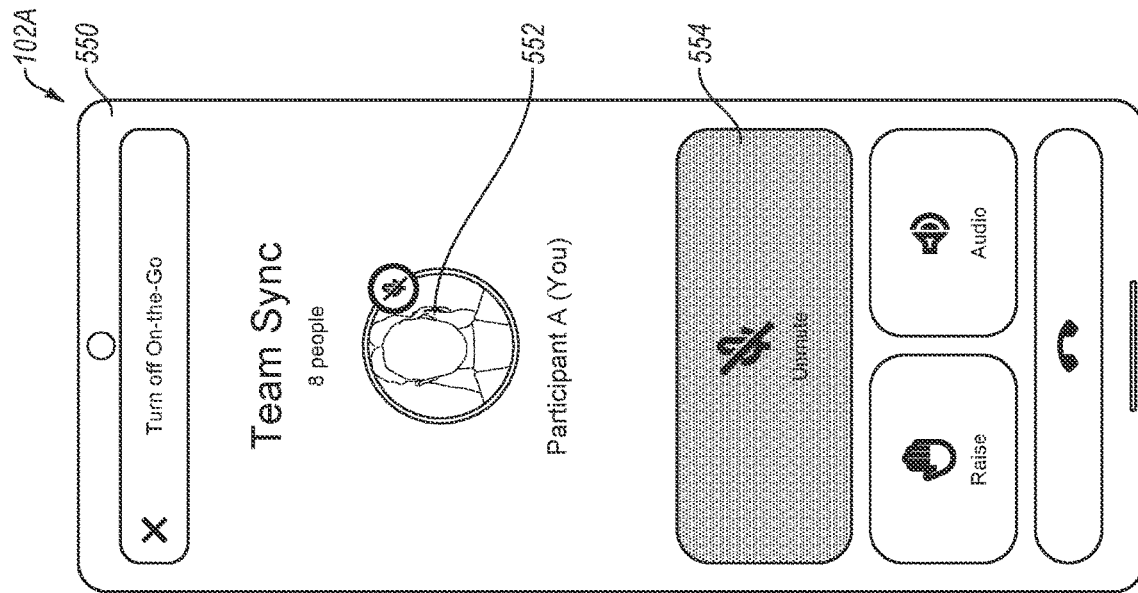
FIG. 5 illustrates example user interfaces (UIs) of a virtual meeting, in accordance with implementations of the present disclosure, according to some embodiments.
Figure 5:
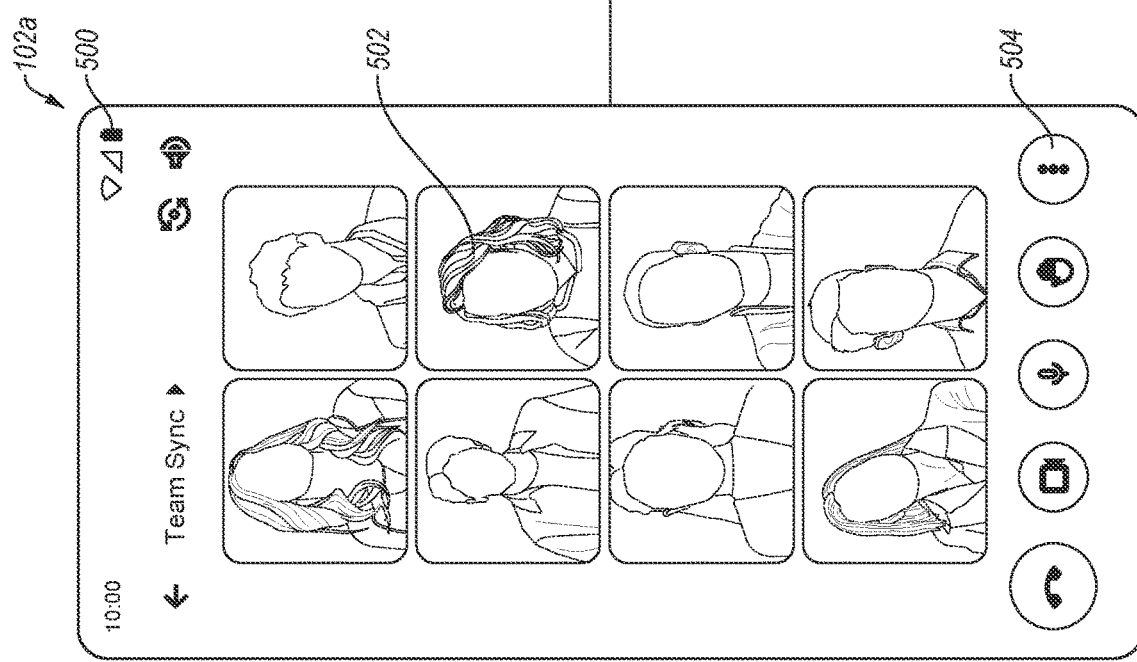

Referring now to FIG. 5, several examples of an interface of a video conferencing application are shown, according to some embodiments. FIG. 5 is shown to include client device 102A, interfaces 500, 550, profile 502, button 504, personal profile 552, and mute button 554. In some embodiments, FIG. 5 shows a transition from interface 500 to interface 550 when the client device 102A is in "update mode." Interface 500 shows various video feeds of participants, which may be displayed during a video meeting with the other participants, including profile 502.

In some embodiments, once the application provides an update (e.g., in response to detecting motion, etc.), client device 102A then displays interface 550, which shows a more limited interactive display. This may be done to improve safety when using the application. For example, it can be safer to not display video feeds and display small interactive buttons when the user is walking. As shown in FIG. 5, the update includes a larger mute button 554, a small display of user profile 552, and removal of the video feeds of the other participants. It is noted that FIG. 5 is merely meant to be exemplary, and the updates should not be considered limiting.

Figure 6A:
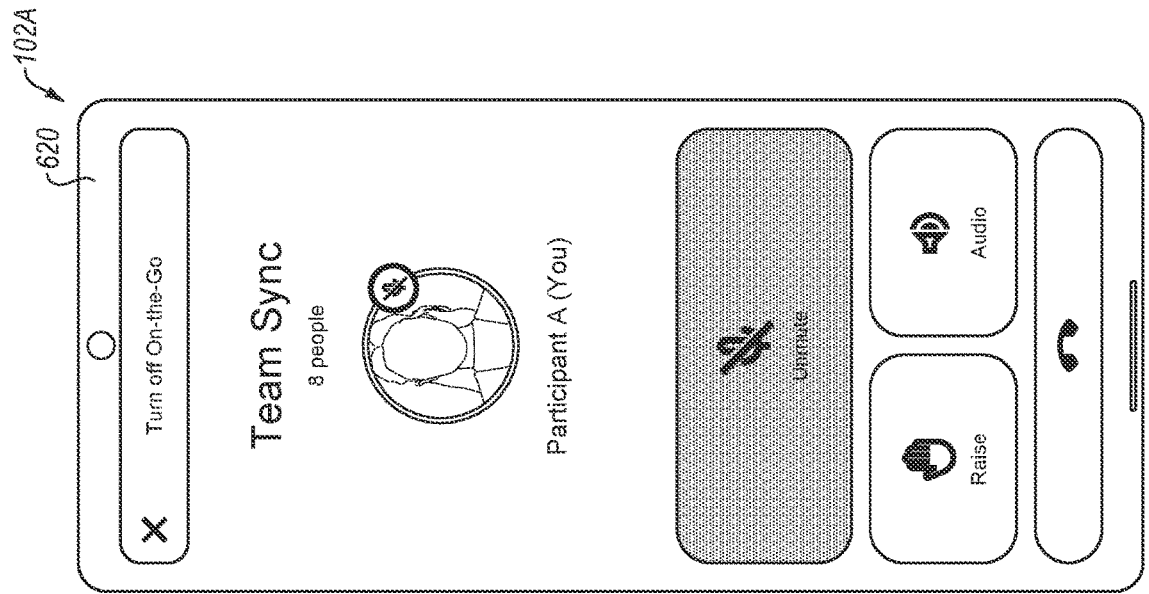
FIG. 6A illustrates example user interfaces (UIs) of a virtual meeting, in accordance with implementations of the present disclosure, according to some embodiments.
Figure 6A:
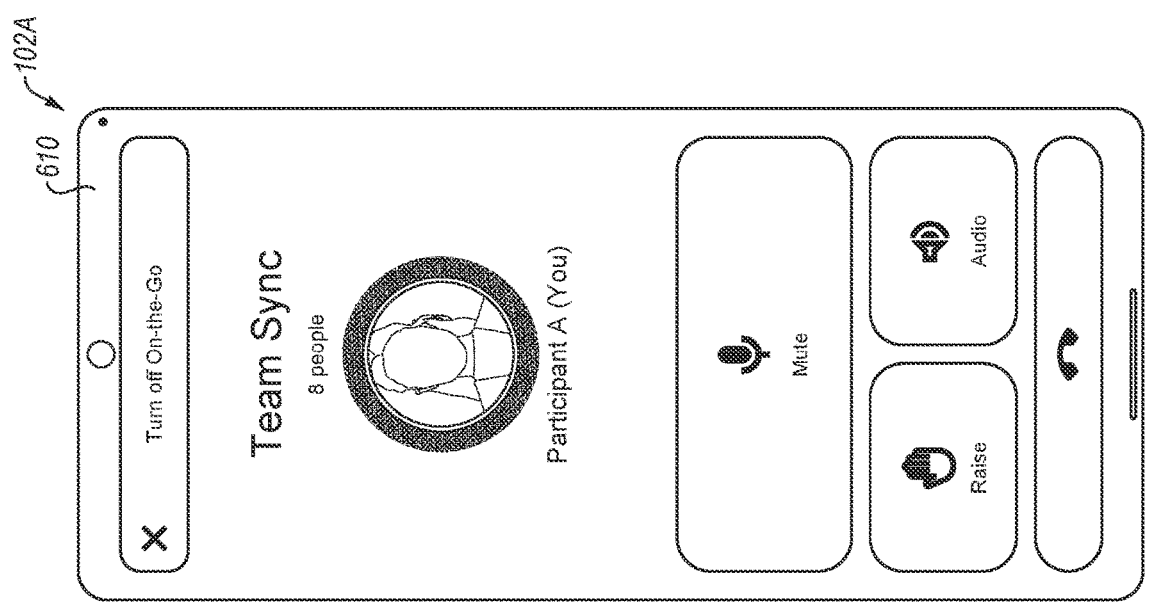

Referring now to FIG. 6A, several interfaces of a video conferencing application displaying audio functionality are shown, according to some embodiments. FIG. 6A is shown to include interfaces 610 and 620. In some embodiments, interface 610 shows an example indication of how the user can know their audio is transmitting when the application is in "update mode." As shown, in FIG. 6A the image of the user's profile may illuminate. Additionally, if the user selects "mute" for the audio in the application, the profile image of the user may display a mute notification. In general, simple and straightforward indications of activity in the video conferencing application can be used when the application is in "update mode."

Figure 6B:
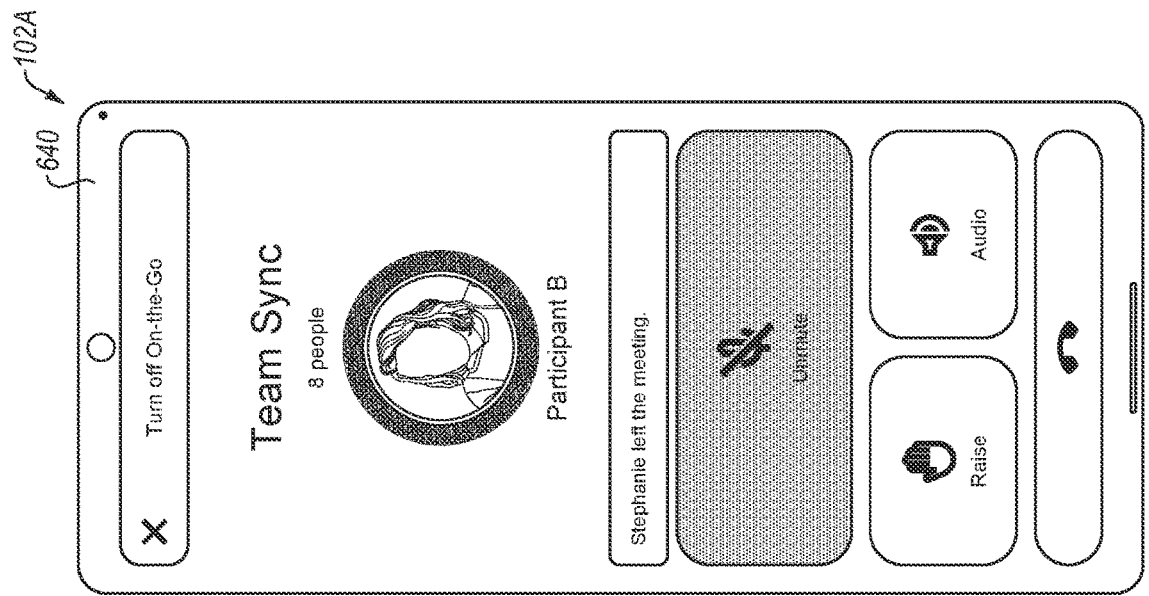
FIG. 6B illustrates example user interfaces (UIs) of a virtual meeting, in accordance with implementations of the present disclosure, according to some embodiments.
Figure 6B:
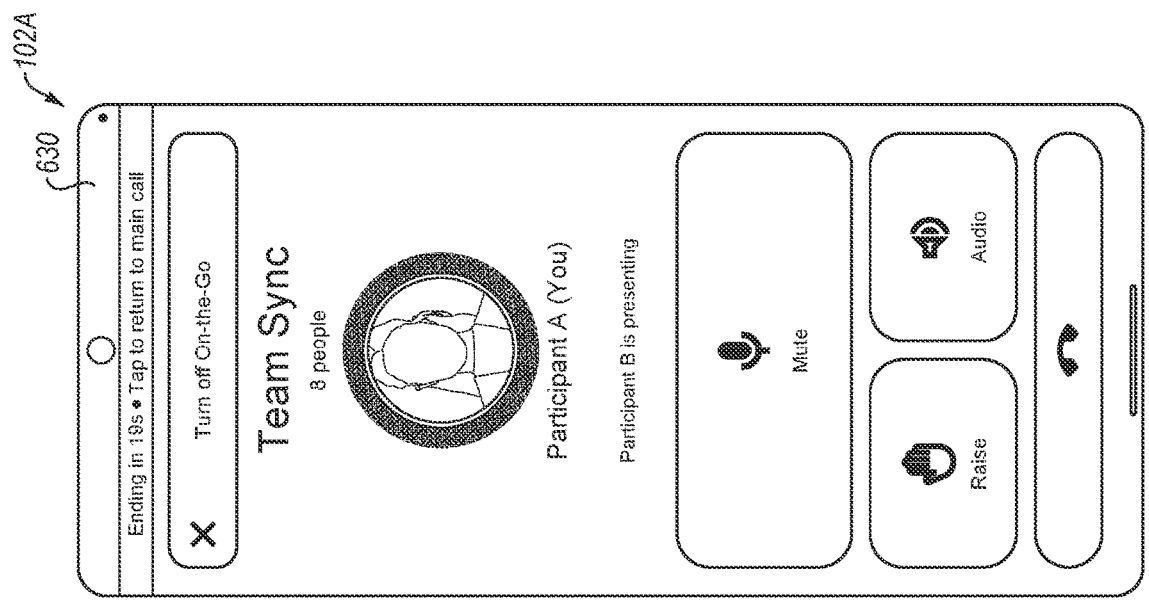

Referring now to FIG. 6B, several interfaces of a video conferencing application displaying audio functionality are shown, according to some embodiments. FIG. 6B is shown to include interfaces 630 and 640. In some embodiments, interfaces 630, 640 are interfaces that could be displayed when the application is in an update mode. For example, in interfaces 630, 640, a notification window is shown that, if selected, would remove the user from an update mode (e.g., "On-the-Go" mode). Updates regarding the video conferencing call may also be displayed when the application is in update mode, such as notifying the user that certain participants have left/joined the meeting, as shown on interface 640.

Referring now to FIG. 7, several interfaces of a video conferencing application displaying update mode functionality are shown, according to some embodiments. FIG. 7 is shown to include interfaces 710, 720, 730. In some embodiments, client device 102A displays interface 710 when the application is in update mode, which may include displaying various restrictions or permissions to the user. As shown on interface 710, this includes a notification that the user is not permitted to speak (e.g., per rules set by the host of the meeting, etc.). While in update mode, the user may also see whether the meeting is being recording or whether a meeting participant is recording, which is shown on interface 720. Interface 730 displays a popup window that presents the user with a request to enter an update mode (e.g., "On-the-Go"). If the user selects to enter the update mode, the application (e.g., via server 130, etc.) may have the ability to then update audio and visual information displayed on interface 730. In some embodiments, the pop-up window is displayed [on] after a type of motion (e.g., walking, driving, etc.) is detected. See step 402 above for further detail.

Figure 8:
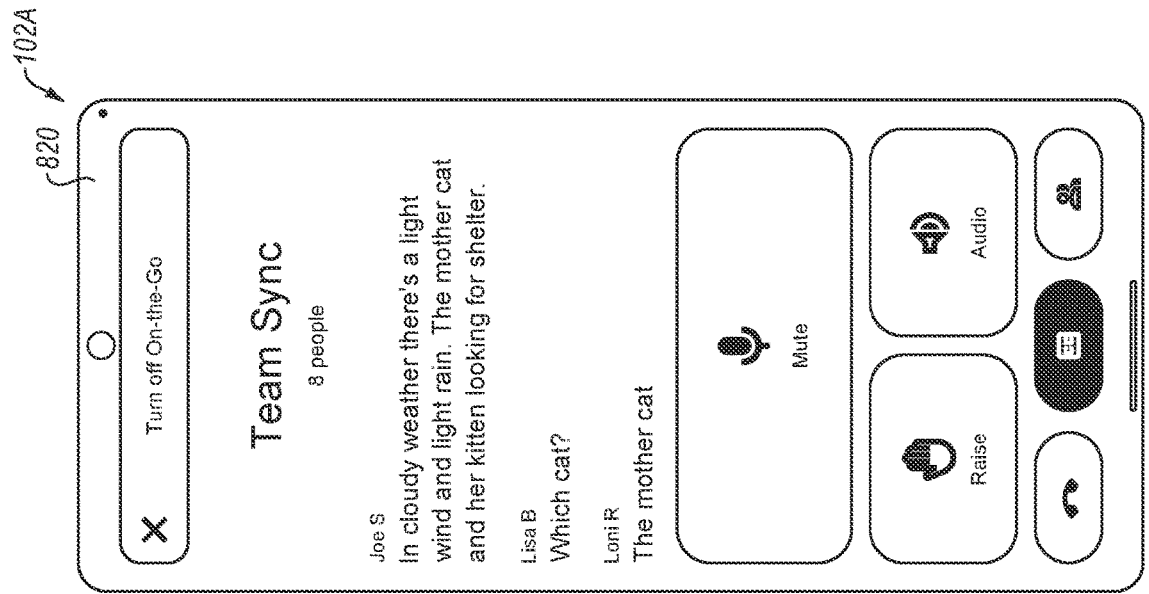
FIG. 8 illustrates example user interfaces (UIs) of a virtual meeting, in accordance with implementations of the present disclosure, according to some embodiments.

Referring now to FIG. 8, several interfaces of a video conferencing application displaying update mode functionality are shown, according to some embodiments. FIG. 8 is shown to include interface 810 and 820. In some embodiments, interfaces 810 and 820 represent instances where the user is in a vehicle or other type of motion where viewing live video feed may be dangerous. As such, once the application (e.g., via server 130) determines that the user is in such a motion, live video feed of other participants in the meeting may be removed. An image may be displayed in lieu of the video feed (e.g., as shown on interface 810) and/or a transcription of the conversation may be displayed in lieu of the video feed (e.g., as shown on interface 820).

Figure 9A:
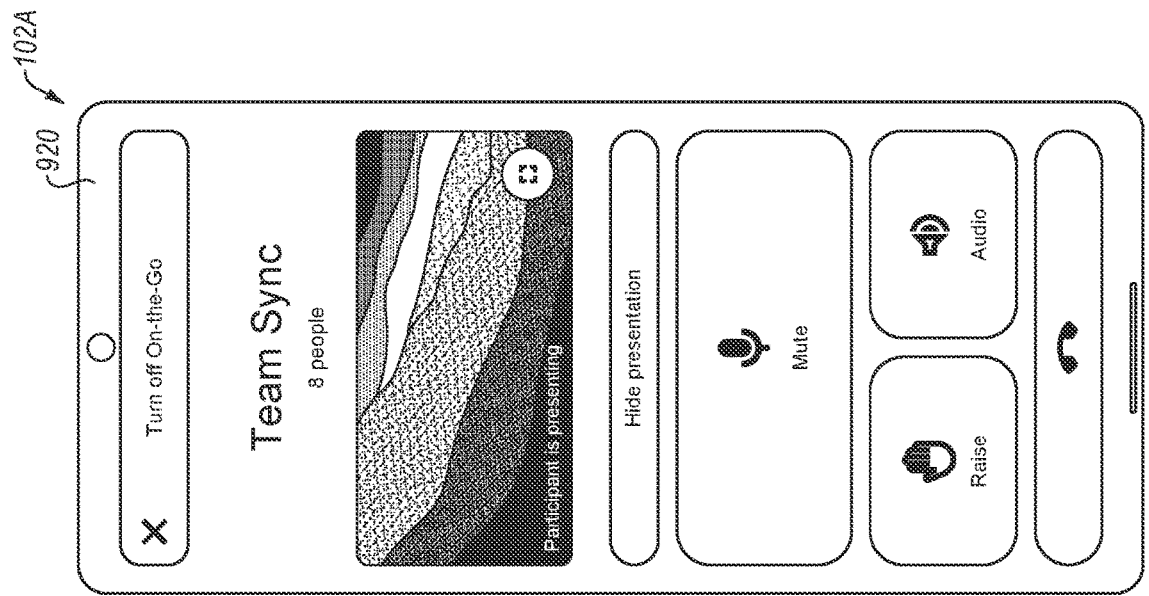
FIG. 9A illustrates example user interfaces (UIs) of a virtual meeting, in accordance with implementations of the present disclosure, according to some embodiments.
Figure 9A:
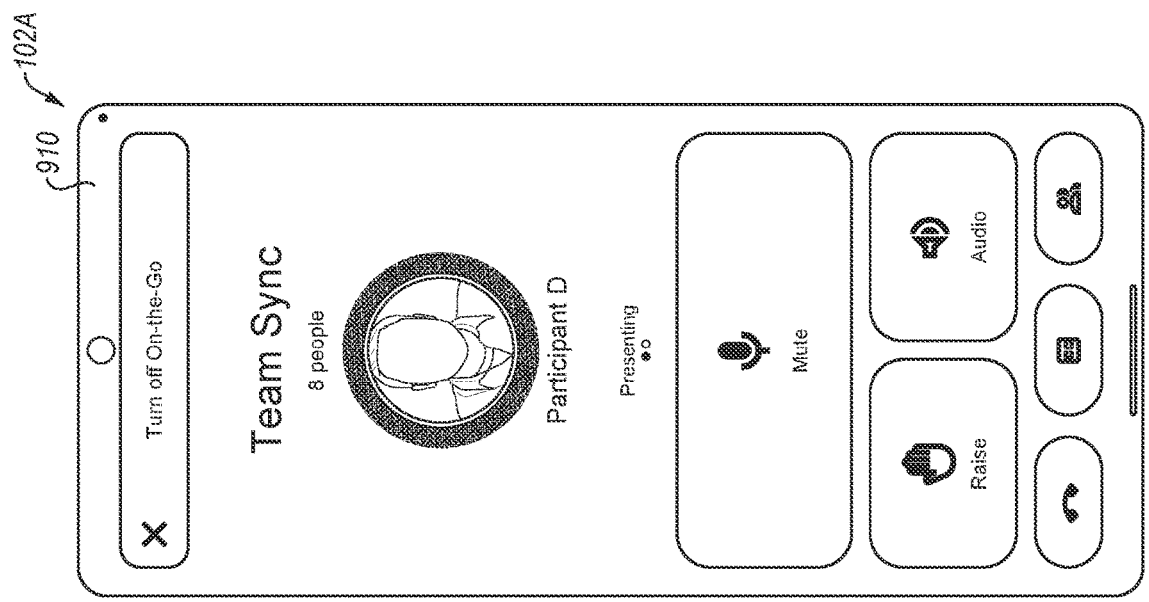
Figure 9B:
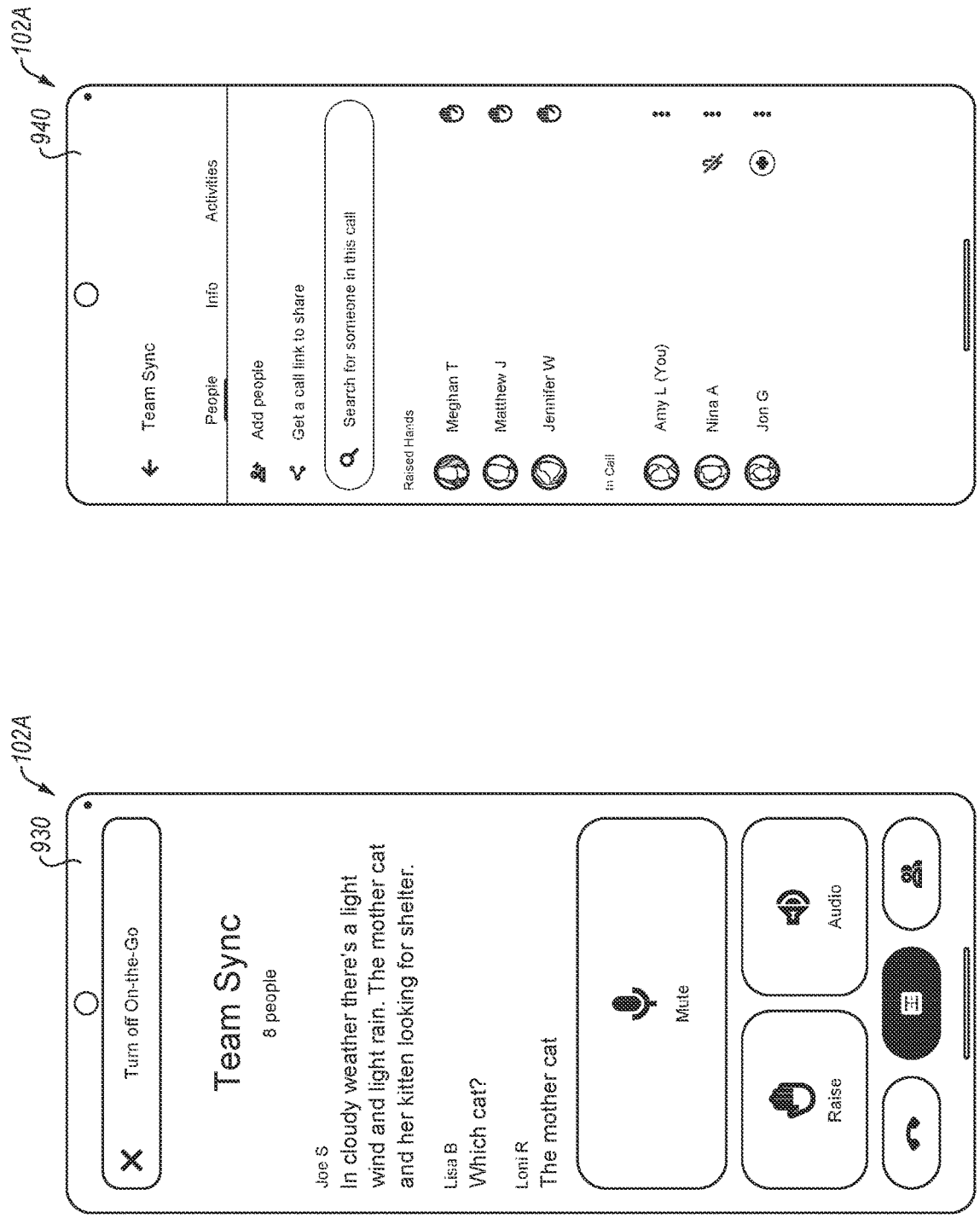
FIG. 9B illustrates example user interfaces (UIs) of a virtual meeting, in accordance with implementations of the present disclosure, according to some embodiments.
Figure 10A:
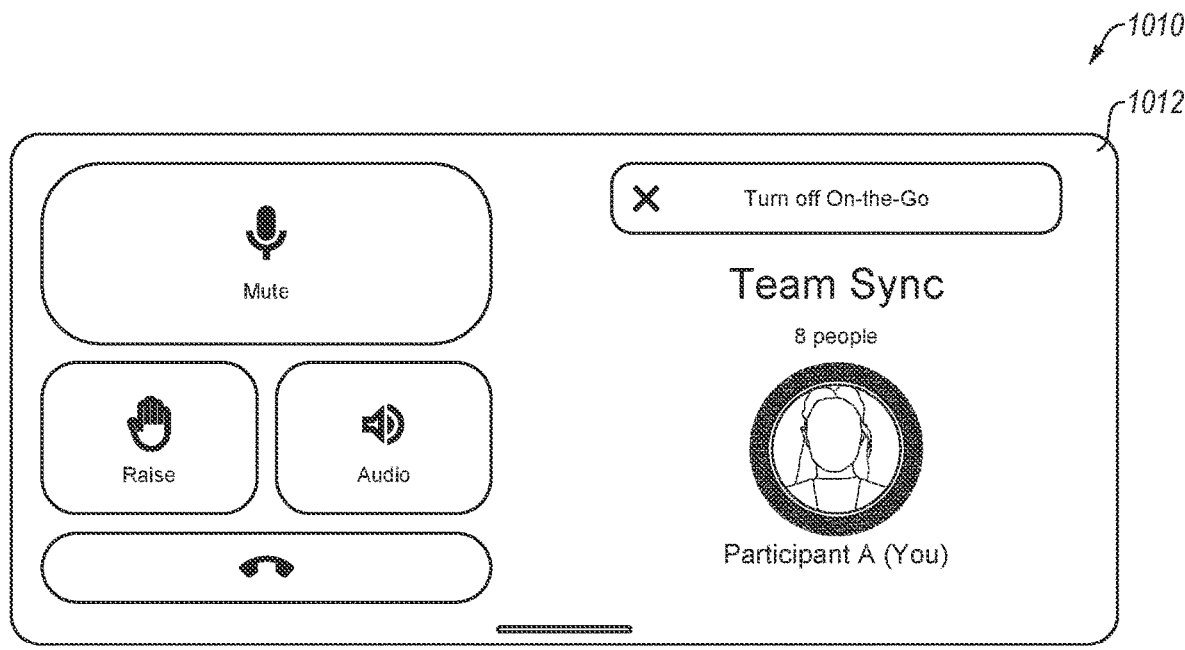
FIG. 10A illustrates example user interfaces (UIs) of a virtual meeting, in accordance with implementations of the present disclosure, according to some embodiments.
Figure 10A:
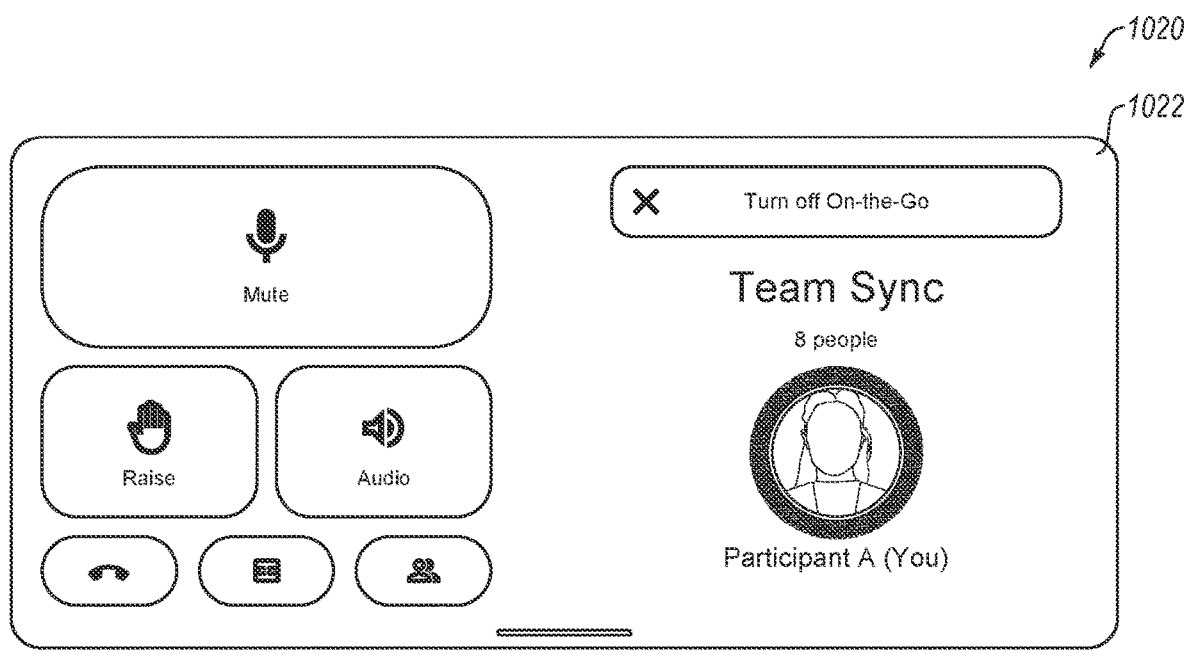
Figure 10B:
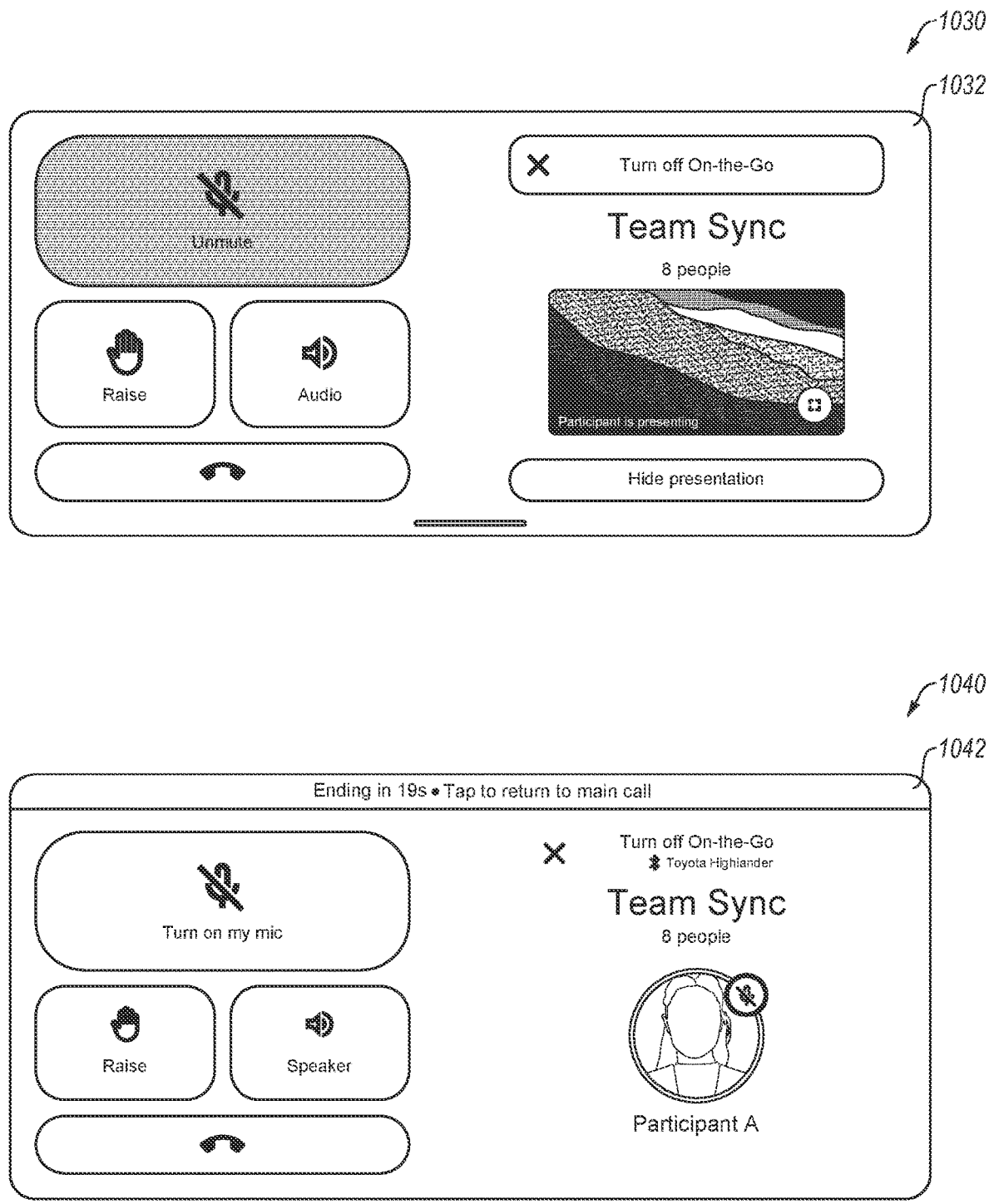
FIG. 10B illustrates example user interfaces (UIs) of a virtual meeting, in accordance with implementations of the present disclosure, according to some embodiments.

Referring now to FIGS. 9A, several interfaces of a video conferencing application displaying update mode functionality are shown, according to some embodiments. FIG. 9A is shown to include interfaces 910, 920 and FIG. 9B is shown to include interfaces 930, 940. For example, interface 910 displays another example of different features available in and update mode-such as viewing meeting participants, closed captioning, raising a hand to speak, identification of the participant that is speaking, and mute functionality. Interface 940 (as shown in FIG. 9B) shows an example display of what a user sees when they wish to view the meeting participants while the application is in update mode, according to some embodiments. Interface 940 shows Referring now to FIGS. 10A-10B, several landscape-oriented interfaces of a video conferencing application displaying update mode functionality are shown, according to some embodiments. FIG. 10A is shown to include interfaces 1010, 1020, and FIG. 10B is shown to include interfaces 1030, 1040. Interfaces 1010, 1020 show various examples of what a user may see if the user oriented their user device (e.g., client device 102A) while using the application in update mode. Similarly, interfaces 1030, 1040 show various notifications that can be displayed while the user is using the application in this orientation, which includes displaying when the call/meeting is ending, whether the user is muted, whether a hand is raised, and an identifier as to who is speaking in the meeting.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to store desired program code in the form of machine-executable instructions or data structures and which can be accessed by a general purpose or special purpose computer or other machine with a processor. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:
1. A method comprising:
receiving, during a virtual meeting between a plurality of participants, an indication of a motion of a first client device of a first participant of the plurality of participants of the virtual meeting;

determining, during the virtual meeting between the plurality of participants and based on the indication of the motion of the first client device of the first participant, whether the motion of the first client device of the first participant corresponds to a motion type of a plurality of motion types that are each associated with a different virtual meeting user interface;

responsive to determining that the motion of the first client device of the first participant corresponds to the motion type of the plurality of motion types, identifying, based on the motion type, a set of interface adjustments for a virtual meeting user interface to be presented on the first client device of the first participant, wherein the set of interface adjustments for the virtual meeting user interface comprises removal of video feeds of at least a subset of participants of the plurality of participants to adjust the virtual meeting user interface to an environment corresponding to the motion type; and causing the virtual meeting user interface presented on the first client device of the first participant to reflect the set of user interface adjustments during the virtual meeting.

2. The method of claim 1, wherein each the plurality of motion types corresponds to a different environment of a plurality of environments comprising one or more of a car driving environment, a bus riding environment, a bike riding environment, a walking environment, or a public place environment.

3. The method of claim 1, further comprising:
responsive to determining that the motion of the first client device of the first participant does not correspond to any motion type of the plurality of motion types, refraining from causing the virtual meeting user interface presented on the first client device of the first participant to reflect the set of user interface adjustments during the virtual meeting.

4. The method of claim 1, further comprising:
upon determining that the motion of the first client device of the first participant corresponds to the motion type of the plurality of motion types, providing, for presentation on the first client device, a prompt to enter an update mode associated with the virtual meeting user interface reflecting the set of interface adjustments; and
receiving, from the first client device, a request to enter the update mode associated with the virtual meeting user interface reflecting the set of interface adjustments.

5. The method of claim 1, further comprising:
upon determining that the motion of the first client device of the first participant corresponds to the motion type of the plurality of motion types, initiating an automatic switching of the first client device to an update mode associated with the virtual meeting user interface reflecting the set of interface adjustments.

6. The method of claim 5, wherein initiating the automatic switching of the first client device to the update mode further comprises:
causing a countdown timer to be presented on the first client device to indicate a remaining time until the virtual meeting user interface reflecting the set of interface adjustments becomes presented on the first client device.

7. The method of claim 1, wherein determining whether the motion of the first client device of the first participant corresponds to the motion type of the plurality of motion types is performed using a trained machine learning model.

8. The method of claim 1, wherein each of the plurality of motion types corresponds to a different set of interface adjustments for the virtual meeting user interface.

9. The method of claim 1, wherein receiving the indication of the motion comprises receiving, from the first client device, one or more of motion data, accelerometer data, audio data, video data or connectivity data during the virtual meeting.

10. The method of claim 1, wherein the set of user interface adjustments comprises one or more of adjustment to size of at least one user interface element, adjustment to placement of at least one user interface element, removal of at least one user interface element, removal of at least one content item, or removal of at least one visual item.

11. The method of claim 1, wherein the set of user interface adjustments comprises addition of at least one of an audio cue for an event occurred during the virtual meeting, a caption for an audio portion of the virtual meeting, a transcript for an audio portion of the virtual meeting, a text-to-voice option to communicate with other participants of the virtual meeting, or an avatar to represent the first participant during communications with other participants of the virtual meeting.

12. The method of claim 1, further comprising:
responsive to determining that the motion of the first client device of the first participant corresponds to the motion type of the plurality of motion types, modifying one or more features used by the first client device during the virtual meeting to adjust to the environment corresponding to the motion type.

13. The method of claim 1, further comprising:
recording interactions of the first participant with the virtual meeting user interface reflecting the set of user interface adjustments during the virtual meeting; and
modifying, based on the recorded interactions, the set of user interface adjustments for use in future virtual meetings of the first participant.

14. A system comprising:
a storage device; and
a processing device, coupled to the storage device, to perform operations comprising:
receiving, during a virtual meeting between a plurality of participants, an indication of a motion of a first client device of a first participant of the plurality of participants of the virtual meeting;
determining, during the virtual meeting between the plurality of participants and based on the indication of the motion of the first client device of the first participant, whether the motion of the first client device of the first participant corresponds to a motion type of a plurality of motion types that are each associated with a different virtual meeting user interface;
responsive to determining that the motion of the first client device of the first participant corresponds to the motion type of the plurality of motion types, identifying, based on the motion type, a set of interface adjustments for a virtual meeting user interface to be presented on the first client device of the first participant, wherein the set of interface adjustments for the virtual meeting user interface comprises removal of video feeds of at least a subset of participants of the plurality of participants to adjust the virtual meeting user interface to an environment corresponding to the motion type; and causing the virtual meeting user interface presented on the first client device of the first participant to reflect the set of user interface adjustments during the virtual meeting.

15. The system of claim 14, wherein each the plurality of motion types corresponds to a different environment of a plurality of environments comprising one or more of a car driving environment, a bus riding environment, a bike riding environment, a walking environment, or a public place environment.

16. The system of claim 14, the operations further comprising:
responsive to determining that the motion of the first client device of the first participant does not correspond to any motion type of the plurality of motion types, refraining from causing the virtual meeting user interface presented on the first client device of the first participant to reflect the set of user interface adjustments during the virtual meeting.

17. The system of claim 14, the operations further comprising:
upon determining that the motion of the first client device of the first participant corresponds to the motion type of the plurality of motion types, providing, for presentation on the first client device, a prompt to enter an update mode associated with the virtual meeting user interface reflecting the set of interface adjustments; and
receiving, from the first client device, a request to enter the update mode associated with the virtual meeting user interface reflecting the set of interface adjustments.

18. A non-transitory machine-readable medium comprising instructions, which when executed by a processor cause the processor to perform operations comprising:
receiving, during a virtual meeting between a plurality of participants, an indication of a motion of a first client device of a first participant of the plurality of participants of the virtual meeting;
determining, during the virtual meeting between the plurality of participants and based on the indication of the motion of the first client device of the first participant, whether the motion of the first client device of the first participant corresponds to a motion type of a plurality of motion types that are each associated with a different virtual meeting user interface;
responsive to determining that the motion of the first client device of the first participant corresponds to the motion type of the plurality of motion types, identifying, based on the motion type, a set of interface adjustments for a virtual meeting user interface to be presented on the first client device of the first participant, wherein the set of interface adjustments for the virtual meeting user interface comprises removal of video feeds of at least a subset of participants of the plurality of participants to adjust the virtual meeting user interface to an environment corresponding to the motion type; and
causing the virtual meeting user interface presented on the first client device of the first participant to reflect the set of user interface adjustments during the virtual meeting.

19. The non-transitory machine-readable medium of claim 18, wherein each the plurality of motion types corresponds to a different environment of a plurality of environments comprising one or more of a car driving environment, a bus riding environment, a bike riding environment, a walking environment, or a public place environment.

20. The non-transitory machine-readable medium of claim 18, the operations further comprising:
responsive to determining that the motion of the first client device of the first participant does not correspond to any motion type of the plurality of motion types, refraining from causing the virtual meeting user interface presented on the first client device of the first participant to reflect the set of user interface adjustments during the virtual meeting.

* * * * *